United States Patent
Ladouceur et al.

(10) Patent No.: US 8,754,756 B2
(45) Date of Patent: Jun. 17, 2014

(54) TACTILE INDICATOR WHICH CHANGES THE TEXTURE OF A SURFACE FOR A PORTABLE ELECTRONIC DEVICE

(75) Inventors: Norman Miner Ladouceur, Wingham (CA); Jason Tyler Griffin, Kitchener (CA); Steven Henry Fyke, Waterloo (CA)

(73) Assignee: Blackberry Limited, Waterloo (CA)

( * ) Notice: Subject to any disclaimer, the term of this patent is extended or adjusted under 35 U.S.C. 154(b) by 302 days.

(21) Appl. No.: 13/273,747

(22) Filed: Oct. 14, 2011

(65) Prior Publication Data
US 2013/0093576 A1  Apr. 18, 2013

(51) Int. Cl.
*G08B 21/00* (2006.01)
(52) U.S. Cl.
USPC ............... 340/407.1; 340/691.1; 455/466
(58) Field of Classification Search
USPC ............. 340/941, 407.1, 691.1; 455/466, 567
See application file for complete search history.

(56) References Cited

U.S. PATENT DOCUMENTS

| | | | | |
|---|---|---|---|---|
| 5,663,703 | A * | 9/1997 | Pearlman et al. | 340/407.1 |
| 5,926,756 | A * | 7/1999 | Piosenka et al. | 455/418 |
| 7,439,872 | B2 | 10/2008 | Hiltunen | |
| 2006/0024647 | A1 | 2/2006 | Chesnais et al. | |
| 2007/0211032 | A1 | 9/2007 | Ahn et al. | |
| 2008/0122589 | A1 | 5/2008 | Ivanov et al. | |
| 2010/0001849 | A1 | 1/2010 | Lee et al. | |
| 2010/0085168 | A1 | 4/2010 | Kyung et al. | |
| 2010/0134416 | A1 | 6/2010 | Karasin et al. | |
| 2010/0231550 | A1 | 9/2010 | Cruz-Hernandez et al. | |
| 2010/0315212 | A1 | 12/2010 | Radivojevic et al. | |

OTHER PUBLICATIONS

European Patent Application No. 11185204.2, Extended European Search Report dated Mar. 15, 2012.

* cited by examiner

*Primary Examiner* — Jeffery Hofsass
(74) *Attorney, Agent, or Firm* — Lesley M. Morrison; Borden Ladner Gervais LLP

(57) ABSTRACT

A method includes determining a status associated with a function of a portable electronic device; and actuating a tactile status indicator to change a texture at a surface of the portable electronic device for a period of time to indicate the status.

20 Claims, 10 Drawing Sheets

TACTILE INDICATOR WHICH CHANGES THE TEXTURE OF A SURFACE FOR A PORTABLE ELECTRONIC DEVICE

TECHNICAL FIELD

The present application relates to tactile indicators for indicating a status of a portable electronic device.

BACKGROUND DISCUSSION

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, tablets and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs, smart telephones or tablets are generally intended for handheld use and ease of portability.

BRIEF DESCRIPTION OF THE DRAWINGS

Embodiments of the present application will now be described, by way of example only, with reference to the attached Figures, wherein.

DETAILED DESCRIPTION

Figure 1:
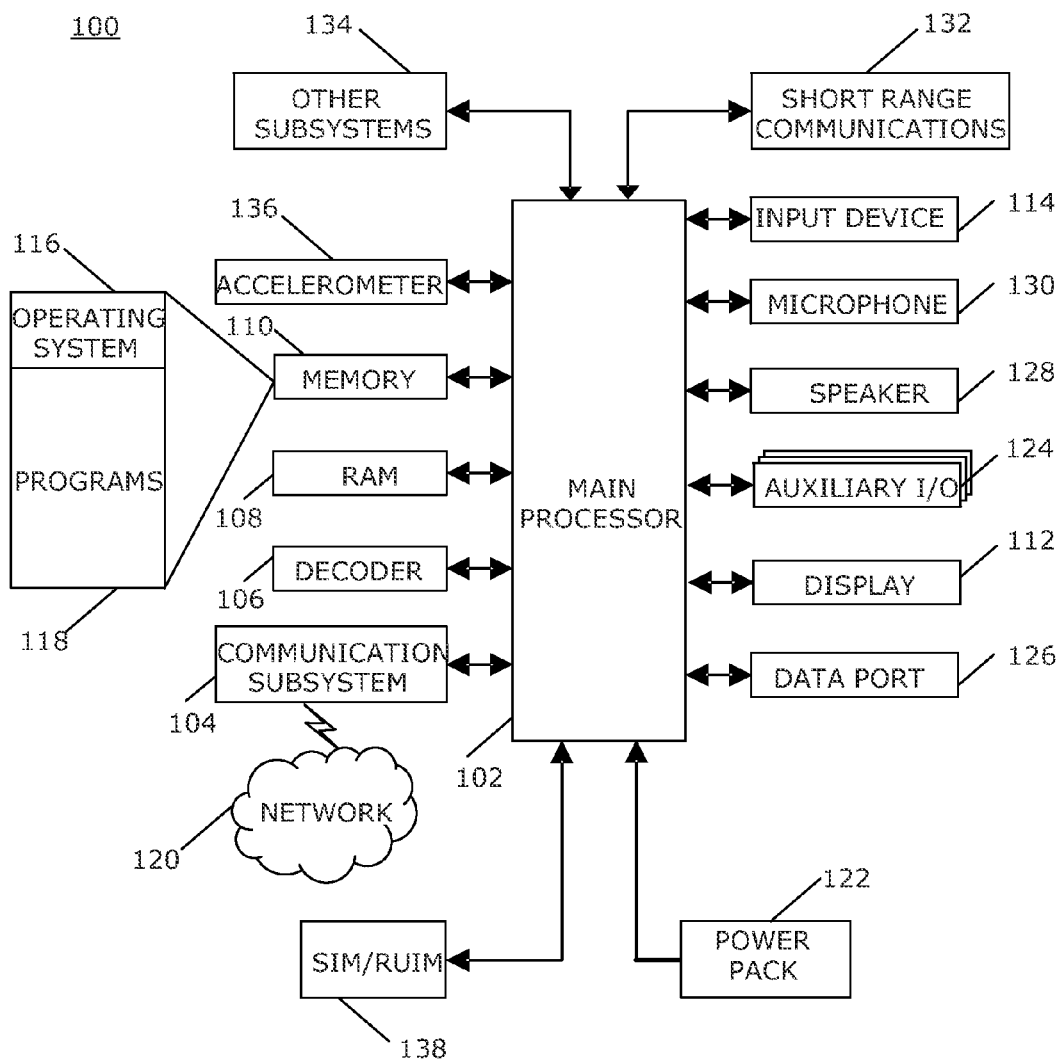
FIG. 1 is a simplified block diagram of one example of a portable electronic device in accordance with the present disclosure.

In an aspect of the disclosure there is provided a method including: determining a status associated with a function of a portable electronic device; and actuating a tactile status indicator to change a texture at a surface of the portable electronic device for a period of time to indicate the status.

In another aspect of the disclosure there is provided a portable electronic device including: a housing; a processor for executing a program stored in memory to determine a status associated with a function of the portable electronic device; and a tactile status indicator for changing a texture of a surface of the housing for a period of time to indicate the status.

In another aspect of the disclosure there is provided a tactile status indicator of a portable electronic device, the tactile indicator including: a projection movable relative to a housing of the portable electronic device, the projection being at least partly aligned with an opening of the housing; a driving mechanism for moving the projection; wherein actuation of the tactile status indicator changes a texture at the surface of the portable electronic device for a period of time to indicate a status of a function of the portable electronic device.

Other aspects and features of the present disclosure will become apparent to those ordinarily skilled in the art upon review of the following description of specific embodiments in conjunction with the accompanying figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 120. The wireless network 120 may be any type of wireless network, including, but not limited to, data wireless networks, voice wireless networks, and networks that support both voice and data communications.

The processor 102 interacts with other components, such as Random Access Memory (RAM) 108, memory 110, an input device 114, such as a keyboard, device buttons or navigation devices, for example, an auxiliary input/output (I/O) subsystem 124, a data port 126, a speaker 128, a microphone 130, short-range communications 132, and other device subsystems 134. The processor 102 may interact with an orientation sensor such as an accelerometer 136 that may be utilized to detect direction of gravitational forces or gravity-induced reaction forces. A power pack 122, such as one or more rechargeable batteries or a port to an external power supply, powers the portable electronic device 100.

The processor 102 further interacts with a display 112, which may be a liquid crystal display (LCD) or other non touch-sensitive display. Alternatively, the display 112 may be a touch-sensitive display. The touch-sensitive display may be capacitive, resistive, infrared, a surface acoustic wave (SAW) touch-sensitive display, strain gauge, optical imaging, dispersive signal technology or acoustic pulse recognition, for example.

To identify a subscriber for network access, the portable electronic device 100 uses a Subscriber Identity Module or a Removable User Identity Module (SIM/RUIM) card 138 for communication with a network, such as the wireless network 120. Alternatively, user identification information may be programmed into memory 110.

The portable electronic device 100 includes an operating system 116 and software programs or components 118 that are executed by the processor 102 and are typically stored in a persistent, updatable store such as the memory 110. Additional applications or programs may be loaded onto the portable electronic device 100 through the wireless network 120, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 120 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
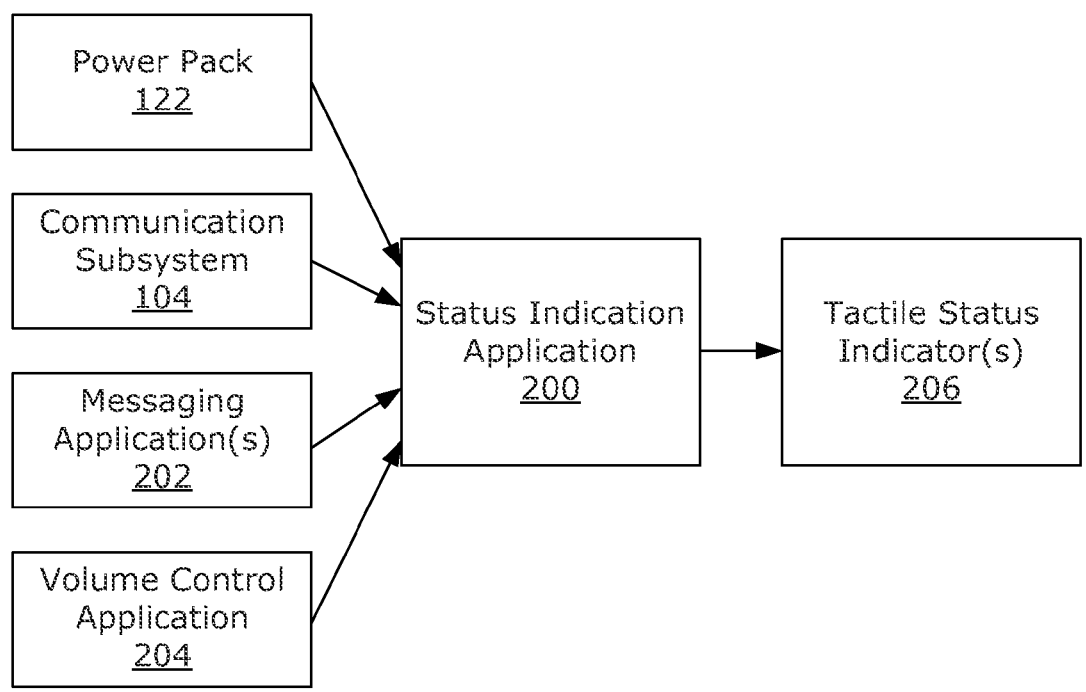
FIG. 2 is block diagram of components for implementing a method in accordance with the present disclosure.

Referring to FIG. 2, a status indication application 200 is in electrical communication with the power pack 122, the communication subsystem 104, a messaging application(s) 202 and a volume control application 204 to receive status information directly or indirectly therefrom. The status application 200 may be computer-readable code executable by at least one processor of the portable electronic device to perform the method and may be stored in a computer-readable medium, such as a non-transitory computer-readable medium.

The status indication application 200 is also in electrical communication with a tactile status indicator 206. The tactile status indicator 206 includes a driving mechanism and at least one projection that is movable relative to a housing of the portable electronic device 100. The tactile status indicator 206 is at least partly aligned with one or more openings through a surface of the housing of the portable electronic device 100. The at least one projection is movable relative to the surface of the housing to change a texture at the surface, which may be tactilely detected by a user. Tactile status indicators may indicate a level associated with a device function or may indicate a state, such as "on", "off", "yes" or "no", for example.

Figure 3A:
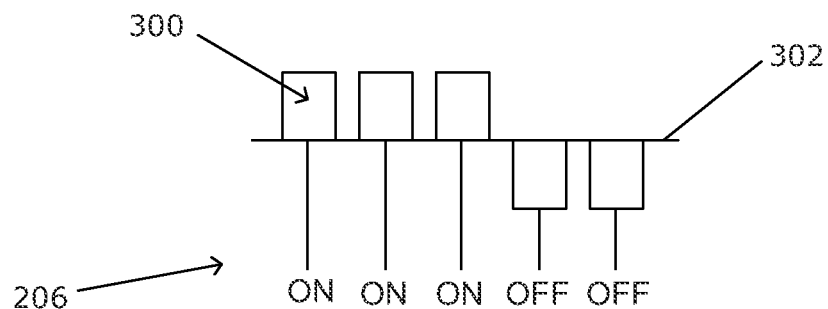
FIGS. 3A, 3B and 3C are schematic side sectional views of example tactile status indicators of a portable electronic device.
Figure 3B:
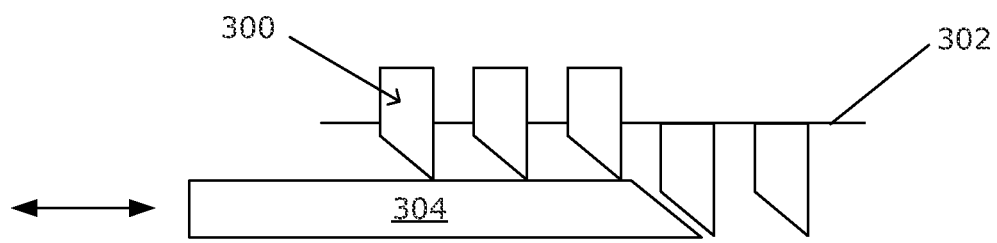
Figure 3C:
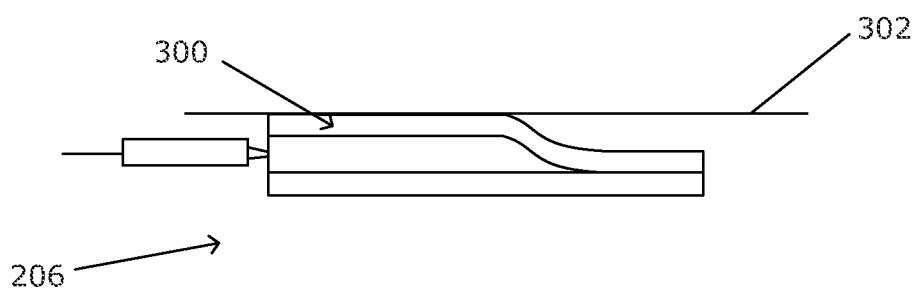

Referring to FIGS. 3A, 3B and 3C, some examples of tactile status indicators 206 are shown. In FIG. 3A, projections 300 are actuated by solenoid switches to raise and lower in response to an electrical current. The projections 300 may be flush with the surface 302 of the housing of the device 100 when in a starting position and moved to a position that is tactilely detectable by a user when actuated. The projections 300 form bars of a gauge to indicate status as a level. In the example of FIG. 3A, the user is able to touch the projections 300 and determine that the status of the function indicated is at approximately 60 percent, since three of the five projections are in the "on" position. In FIG. 3B, the projections 300 are actuated by an electromechanical cam 304 positioned below the projections 300. The electromechanical cam 304 sequentially forces the projections 300 from a starting position, which may be flush with the surface 302, to a tactilely detectable position above the surface 302. In FIG. 3C, a tube, or chamber, that is filled by a micro fluid power hydraulic pump functions as a single projection 300 that shortens and/or lengthens to indicate a status. Similar to FIG. 3A, the tactile status indicators 206 of FIGS. 3B and 3C are also gauges, which tactilely indicate a level to the user.

The tactile status indicator 206 may be a single projection that is movable from a starting position to a tactilely detectable position in order to indicate a status. Alternatively other mechanisms capable of changing a texture at a surface for a period of time may be used. The portable electronic device may include any number of tactile status indicators 206 at different housing surface locations. The tactile status indicators 206 may be gauges, individual projections or a combination of both. Although the status indicators are shown as projections, the status indicators may instead be depressions or a combination of depressions and projections, for example.

Figure 4:
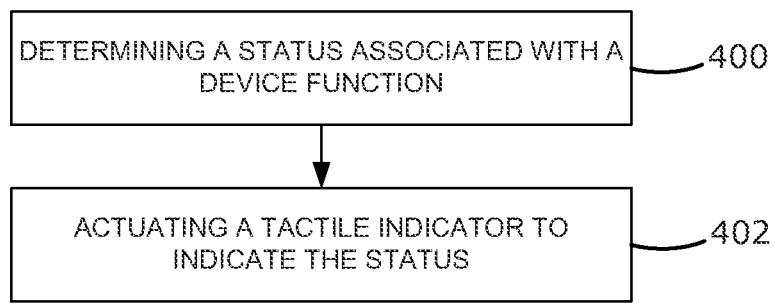
FIG. 4 is a flow chart illustrating an example method of indicating a status at a portable electronic device, in accordance with the disclosure.

A flow chart illustrating an example method of indicating a status at the portable electronic device 100 is shown in FIG. 4. The steps of FIG. 4 may be carried out by routines or subroutines of software executed by, for example, the processor 102. Coding of software for carrying out such steps is well within the scope of a person of ordinary skill in the art given the present description.

The status indication application 200 determines at 400 a status associated with a device function. The device function may be communication with a wireless network, powering the portable electronic device 100, volume control or electronic messaging, for example. When the status has been determined at 400, the tactile status indicator 206 is actuated at 402 to indicate a status by changing a texture at the surface of the portable electronic device 100 for a period of time.

The status may be determined according to a status determination schedule, which may be set at regular intervals, for example. The schedule may be set by the manufacturer and may be customizable by the user. Alternatively, the status may be determined when a user is on a telephone call or when there is a change in a device function. In addition, the status may be determined when a device function may be compromised as a result of a change, such as when there is a rapid reduction in the antenna strength or when the battery level is very low, for example.

The period of time may begin when a first status is determined and end when there is a change in the status. The period of time may be when a telephone application is active during a telephone call.

Figure 5:
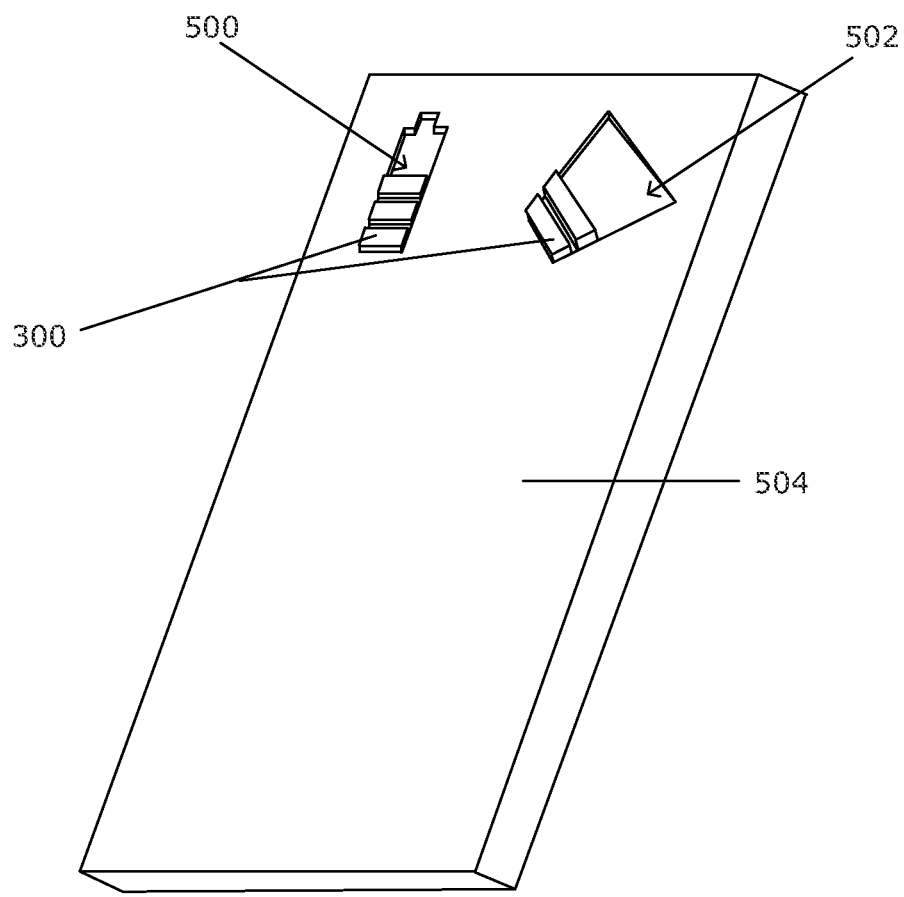
FIG. 5 is an isometric rear view of an example portable electronic device.

Continued reference is made to FIG. 4 with additional reference to FIG. 5 to describe an example of indicating a status at the portable electronic device 100. In the present example, a first tactile status indicator 500 that indicates a strength of the battery and a second tactile status indicator 502 that indicates a signal strength of the wireless network are provided on a back 504 of the portable electronic device 100. The status indication application 200 determines at 400 a status associated with the device power, which is a battery level in this example, and communication with a wireless network, which is signal strength in this example. The tactile status indicators 500, 502 are actuated 402 to indicate a status, as shown in FIG. 5. The first tactile status indicator 500 includes three projections 300 in a tactilely detectable position to indicate a battery level of approximately 60 percent, since three of the five projections are tactilely detectable. The second tactile status indicator 502 includes two projections 300 in a tactilely detectable position to indicate a signal strength of approximately 40 percent, since two of the five projections are tactilely detectable.

Figure 6A:
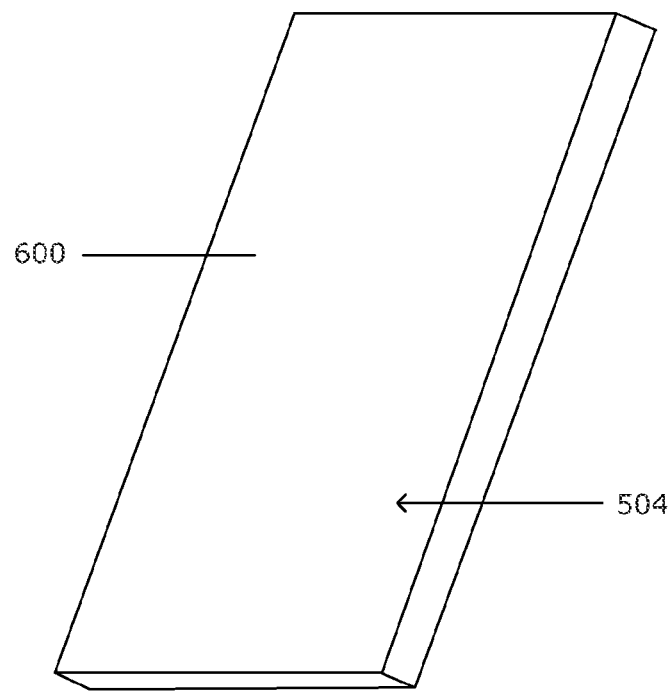
FIG. 6A is an isometric rear view of another example portable electronic device.
Figure 6B:
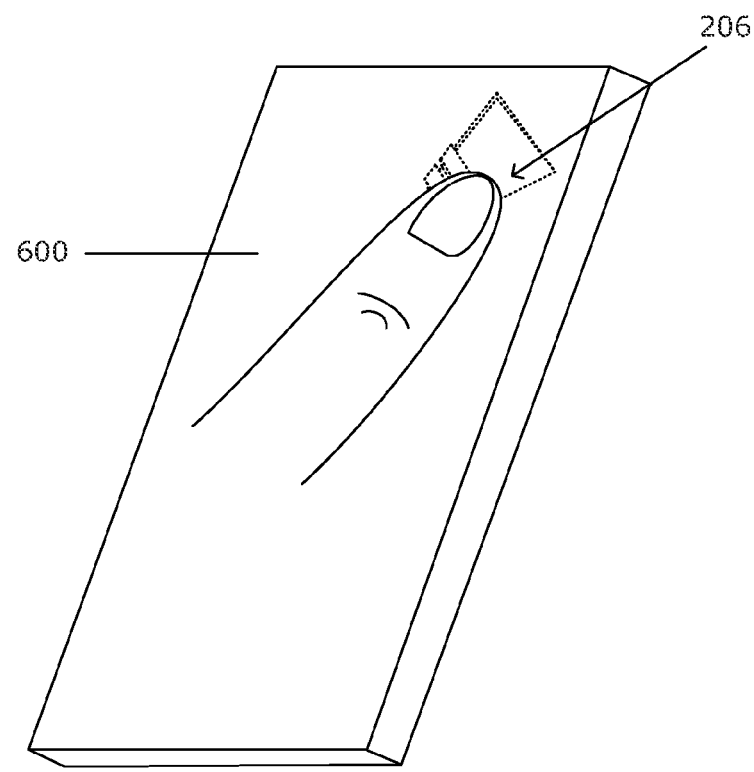
FIG. 6B is a schematic isometric rear view of the portable electronic device of FIG. 6A.

Continued reference is made to FIG. 4 with additional reference to FIGS. 6A and 6B to describe another example of indicating a status at the portable electronic device 100. In the present example, a flexible membrane 600 extends over at least a portion of the back 504 of the portable electronic device 100. A status is determined at 400 and the tactile status indicator 206, which is provided on the back 504 of the portable electronic device 100, is actuated at 402 to indicate a signal strength of the wireless network. The flexible membrane 600 covers the tactile status indicator 206 so that the tactile status indicator 206 is not visually detectable, as shown in FIG. 6A. However, when the status indicator 206 is actuated, it may be tactilely detected by the user, as depicted in FIG. 6B.

Figure 7:
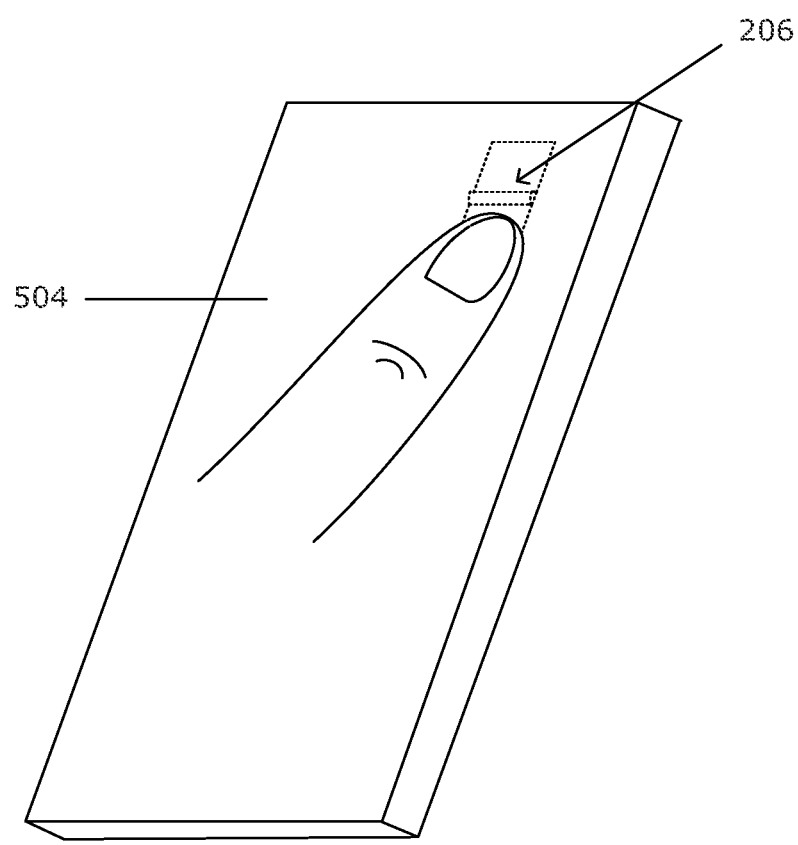
FIG. 7 is an isometric rear view of another example portable electronic device.

Continued reference is made to FIG. 4 with additional reference to FIG. 7 to describe another example of indicating a status at the portable electronic device 100. In the present example, the tactile status indicator 206 is a material that has a surface texture that may be electrically controlled. In the present example, the material is located on the back 504 of the portable electronic device 100. When the status indication application 200 determines 400 a status associated with the wireless network, such as signal strength, the tactile status indicator 206 is actuated at 402 to change a texture at the back 504 of the portable electronic device 100 to indicate the status. The tactile status indicator 206 causes the material to harden locally for a period of time. The hardened portion of the material may not be detected visually; however, it may be detected tactilely, as shown in FIG. 7.

Figure 8:
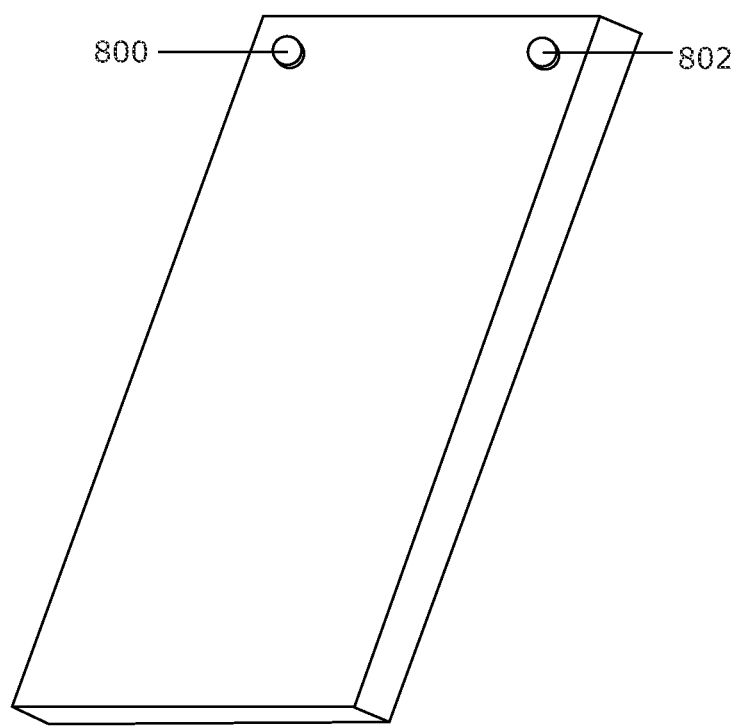
FIG. 8 is an isometric rear view of another example portable electronic device.

Continued reference is made to FIG. 4 with additional reference to FIG. 8 to describe another example of indicating a status at the portable electronic device 100. In the present example, a first tactile status indicator 800 that is a single projection 300 indicates arrival of one or more new electronic messages, which belong to a category of messages such as messages received from a particular address, or messages received at a personal email account, for example. A second tactile status indicator 802 that is also a single projection 300 indicates arrival of one or more voicemail messages. The status indication application 200 determines at 400 a status associated with the category of messages in the messaging application and the voicemail application. The first tactile status indicator 800 and the second tactile status indicator 802 are then actuated at 402 to change a texture at the surface of the portable electronic device 100 for a period of time to indicate the status of the indicators 800, 802.

Figure 9:
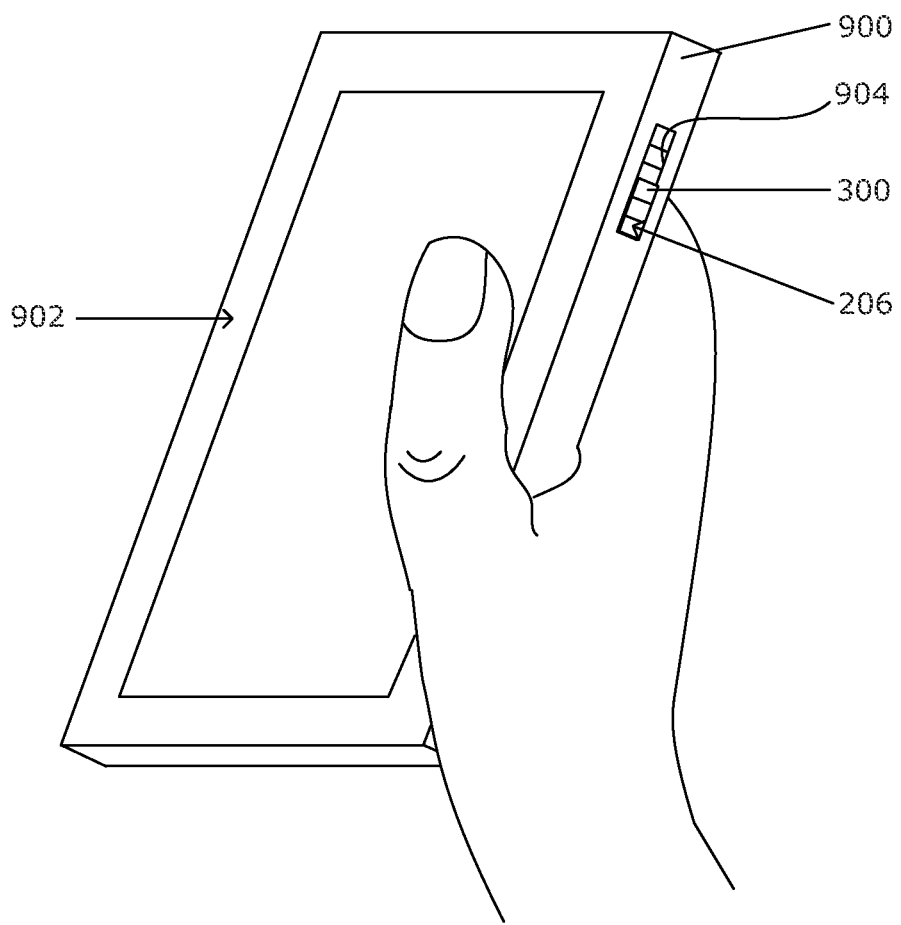
FIG. 9 is an isometric front view of an example portable electronic device.

Continued reference is made to FIG. 4 with additional reference to FIG. 9 to describe another example of indicating a status at the portable electronic device 100. In the present example, the tactile status indicator 206 is provided on a side 900 of a housing 902 and at least partly aligned with opening 904 of the portable electronic device 100. The status indication application 200 determines 400 a status associated with the device volume, which is a volume level in this example. The tactile status indicator 206 is then actuated at 402 to change a texture at the side 900 to indicate the status.

In addition to being actuable to indicate a status, the projections 300 of the tactile status indicator 206 may also detect a user input in the form of a touch or a pressure. When a user input is received, the volume may be increased or decreased in response. Therefore, the tactile status indicator 206 in the example of FIG. 9 functions as both a volume adjustment device and a status indication device. The tactile status indicator 206 facilitates tactile adjustment of the volume without requiring the user to look at a graphic indicator.

Figure 10:
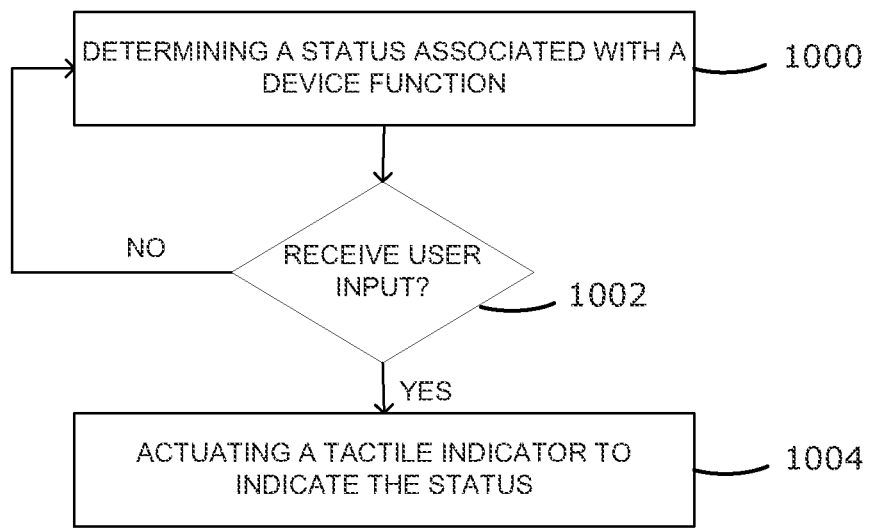
FIG. 10 is flow chart illustrating another example method of indicating a status at a portable electronic device, in accordance with the disclosure.

A flow chart illustrating another example method of indicating a status at the portable electronic device 100 is shown in FIG. 10. The steps of FIG. 10 may be carried out by routines or subroutines of software executed by, for example, the processor 102. Coding of software for carrying out such steps is well within the scope of a person of ordinary skill in the art given the present description.

The status indication application 200 determines at 1000 a status associated with a device function. The device function may be communication with the wireless network, powering the portable electronic device 100, volume control or electronic messaging, for example. When a user input is received at 1002, the tactile status indicator is actuated at 1004 to change a texture at the surface of the portable electronic device 100 for a period of time. When no user input is received 1002, the status indication application 200 again determines at 1000 a status associated with a device function according to a status determination schedule. The user input may be a user touch received by a capacitive touch surface, for example.

In one example, the methods of FIG. 4 and FIG. 10 are performed when the user is holding the portable electronic device 100. When the portable electronic device 100 is not being held, such as when the portable electronic device 100 is located on a table operating in speaker phone mode, or received in a holster, the method is not performed. Methods and apparatus for determining when the portable electronic device 100 is being held by a user's hands are know in the art and will not be described further here.

The example tactile status indicators disclosed herein have been shown on a surface of a portable electronic device 100. Tactile status indicators may also be provided on an accessory such as a clip, or an alerting device, for example. The status may be determined at the portable electronic device 100 and the tactile status indicator(s) 206 of the accessory may receive status information wirelessly.

It will be appreciated that the device functions for which status may be indicated are not limited to those described herein. Status information associated with any function or application may be indicated. For example, in a messaging application, a number of new messages may be indicated when a device is powered up or removed from a holster, or in a GPS-based application, location of a co-worker's device within a predetermined range of the portable electronic device may be indicated. The portable electronic device 100 may indicate completion of tasks or may indicate tasks that require attention including GPS location status, a completed download, an overdue calendar appointment, network roaming charge or a depletion of minutes, for example.

Providing a tactile indication of signal strength and power level while the user is participating in a telephone call allows the user to be aware of any reduction in signal strength or power level without having to interrupt the call to look at the display. The user may then be able to move to a location where the signal strength is greater or end the call before the call is unintentionally dropped.

Further, by providing a tactile indication of volume level, the user may be made aware of the current volume so that when the volume is at a maximum the user will be able to evaluate whether or not the caller's voice is sufficiently audible and end or continue the call, rather than continuously attempt to increase the volume, which may be frustrating.

In addition, by providing a tactile indication associated with a messaging application, the user may immediately and discreetly be made aware of an important message. When the portable electronic device is operating in a silent mode, or when it would not be appropriate to visually check the device status, the method and device described herein provides one or more device status indication(s) in a discreet and timely manner.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A method comprising:
   determining a status associated with a function of a portable electronic device; and
   actuating a tactile status indicator to change a texture at a surface of the portable electronic device for a period of time to indicate the status;
   wherein the status is tactilely indicated as a level on a gauge.

2. A method as claimed in claim 1, wherein the surface is part of a housing of the portable electronic device.

3. A method as claimed in claim 1, wherein the surface is part of a housing of an accessory.

4. A method as claimed in claim 1, wherein the function is one of: communication with a wireless network, powering the portable electronic device, volume control of the portable electronic device and a device application.

5. A method as claimed in claim 4, wherein when the function is the volume control of the portable electronic device, adjusting a volume in response to a user input.

6. A method as claimed in claim 1, wherein the status is indicated in response to a user input.

7. A method as claimed in claim 6, wherein the user input is a touch near the tactile status indicator.

8. A method as claimed in claim 1, wherein a flexible membrane covers the surface to hide the tactile status indicator.

9. A method as claimed in claim 1, wherein the period of time is when a telephone application is active.

10. A method as claimed in claim 1, wherein the period of time begins when the status is determined and ends when there is a change in the status.

11. A method as claimed in claim 1, wherein the status of the function of the portable electronic device is determined when there is a change in the device function.

12. A computer-readable medium comprising instructions executable on a processor of an electronic device for implementing the method of claim 1.

13. A portable electronic device comprising:
   a housing;
   a processor for executing a program stored in memory to determine a status associated with a function of the portable electronic device; and
   a tactile status indicator to change a texture at a surface of the housing for a period of time to indicate the status;
   wherein the status is tactilely indicated as a level on a gauge.

14. A portable electronic device as claimed in claim 13, wherein the tactile status indicator is actuated in response to a user touch.

15. A portable electronic device as claimed in claim 13, wherein the function is one of: communication with a wireless network, powering the portable electronic device, volume control of the portable electronic device and a device application.

16. A tactile status indicator of a portable electronic device, the tactile status indicator comprising:
   a projection movable relative to a housing of the portable electronic device, the projection being at least partly aligned with an opening of the housing;
   a driving mechanism for moving the projection to change a texture at the surface of the portable electronic device for a period of time to indicate a status of a function of the portable electronic device;
   wherein the status is tactilely indicated as a level on a gauge.

17. A tactile status indicator as claimed in claim 16, wherein the driving mechanism is one of: a solenoid switch, an electromechanical cam and a hydraulic pump.

18. A tactile status indicator as claimed in claim 16, comprising more than one projection.

19. A tactile status indicator as claimed in claim 16, wherein the function is one of: communication with a wireless network, powering the portable electronic device, volume control of the portable electronic device and a device application.

20. A tactile status indicator as claimed in claim 16, wherein when the function is the volume control of the portable electronic device, a volume is adjustable in response to a user input.

* * * * *